2,947,552
EASEL BOOK STRUCTURE

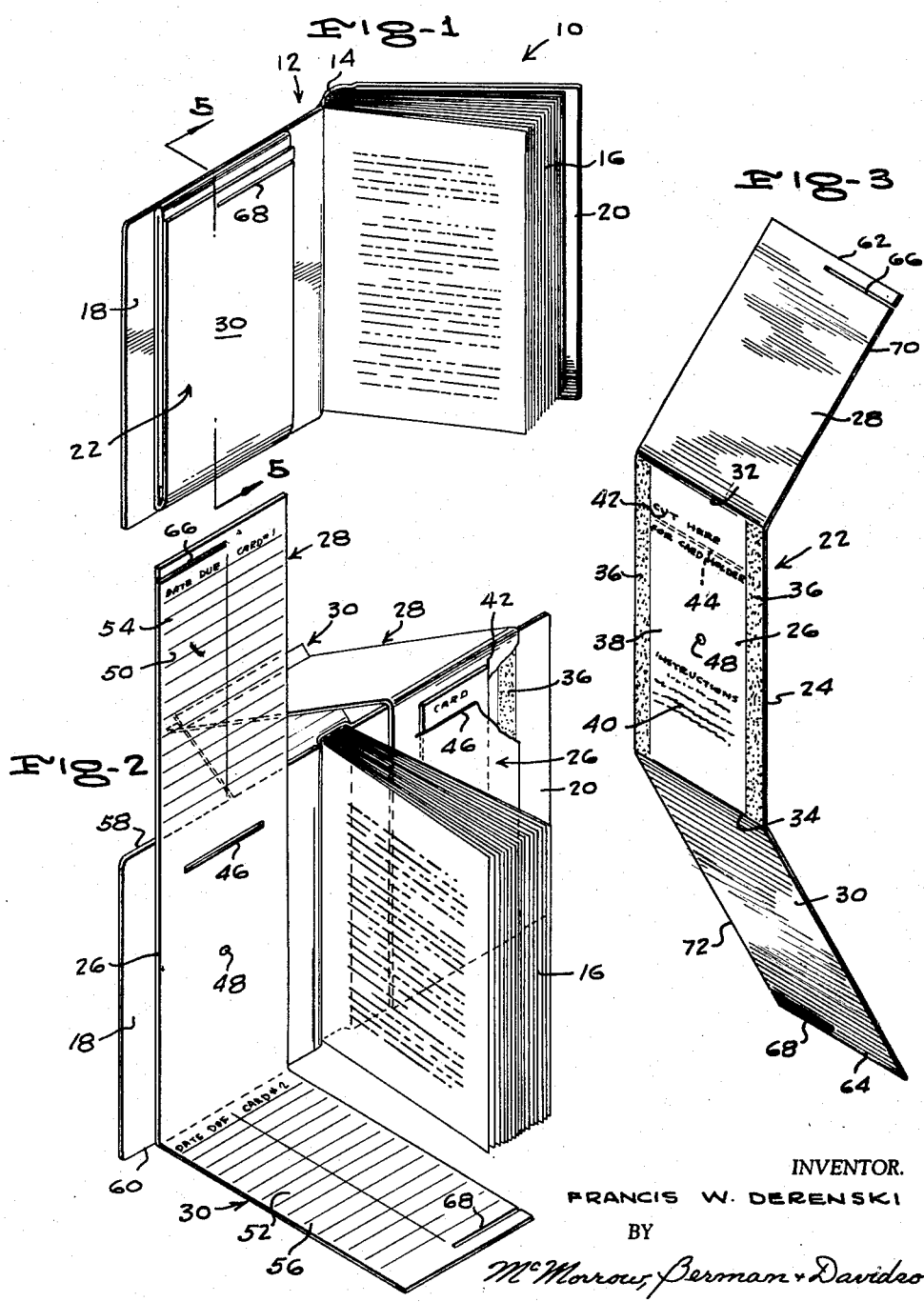

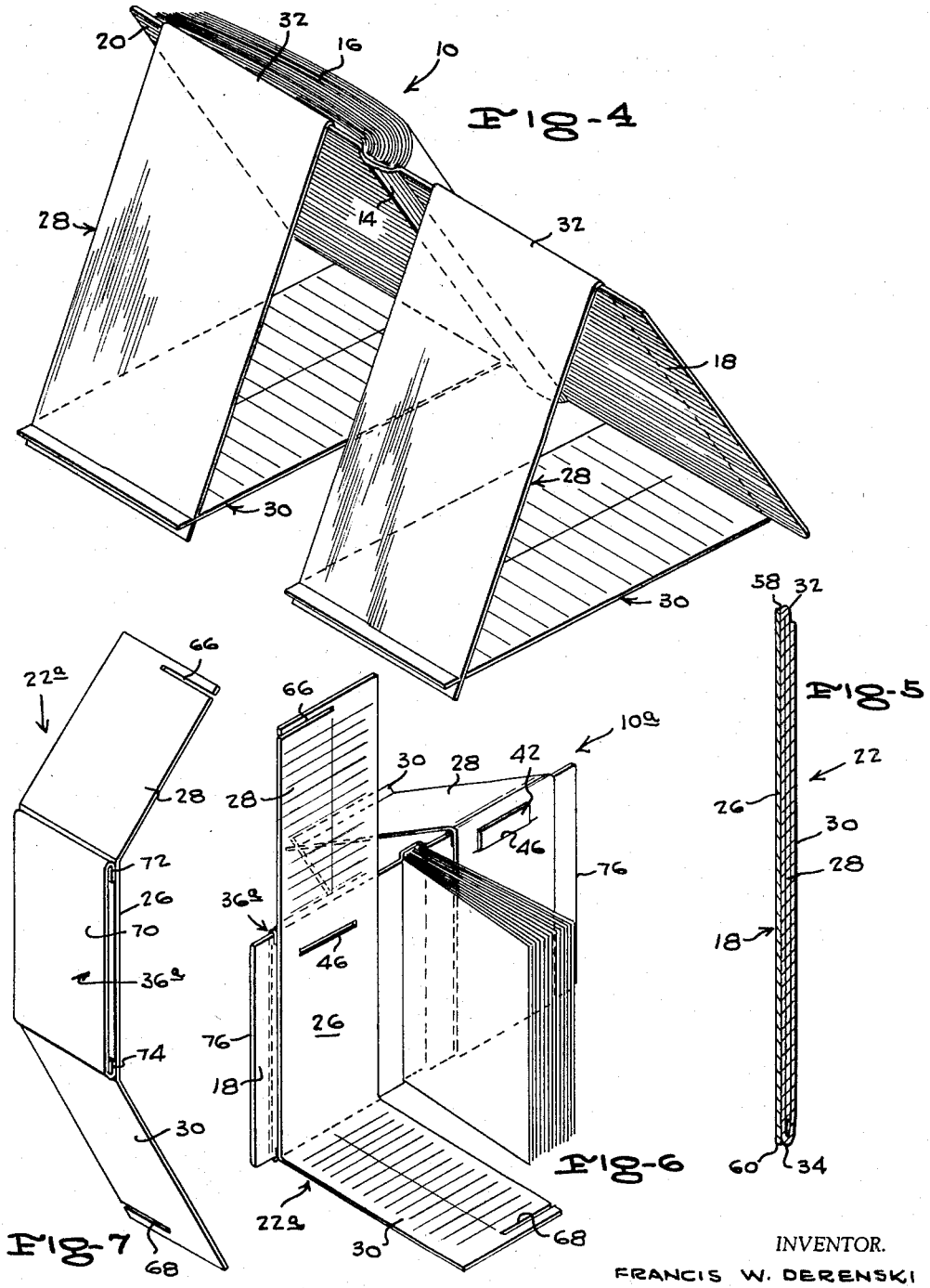

Francis Warren Derenski, 1807½ Tamarend Ave.,
North Hollywood 28, Calif.

Filed Aug. 8, 1958, Ser. No. 753,918

2 Claims. (Cl. 281—33)

This invention relates to an improved book structure having foldable easel means on its front and/or back covers, which are enclosed and concealed while the cover and/or covers are closed, and which can be unfolded to support the book structure in an angled open reading position.

The primary object of the invention is to provide an easel book structure of the character indicated which provides for a more correct and easily read position of a book on any support, and relaxation of the reader, which reduces handling of a book and wear thereon and prolongs the useful life of a book, and which adds little to the cost of a book.

Another object of the invention is to provide easel means of the character indicated above, in the form of accessories to be installed on books without substantial mutilation or harm to books, the easel means being readily attachable to the inner sides of the covers of books.

A further object of the invention is to provide easel means of the character indicated above, which, as for lending library books, afford record spaces for recording the "out" and "in" back dates for the books, and other pertinent information and reminders, and which afford said pockets to hold such as reader identification cards and library classification cards.

Other important objects and advantageous features of the invention will be apparent from the following description and the accompanying drawings, wherein, for purposes of illustration only, a specific form of the invention is set forth in detail.

In the drawings:

Figure 1 is a perspective view of book structure of the invention, showing the same partly open and with easel means in folded position;

Figure 2 is a perspective view similar to Figure 1, showing the same in fully open position, with one of the easel means in partly unfolded position and the other easel means in fully unfolded and supporting position;

Figure 3 is a rear perspective view of easel means before installation;

Figure 4 is a rear perspective view showing the book structure fully opened and both easel structures in unfolded and supporting positions;

Figure 5 is an enlarged vertical section taken on the line 5—5 of Figure 1;

Figure 6 is a perspective view similar to Figure 2 involving another form of easel means; and Figure 7 is a rear perspective view of such other form of easel means.

Referring in detail to the drawings, wherein like or similar numerals designate like parts throughout the several views, and first to Figures 1 to 5 thereof, the numeral 10 generally designates a book structure of the invention, comprising a book 12 of generally conventional construction, involving a back 14 to which are bound pages 16, with relatively stiff front and rear covers 18 and 20, respectively, hinged to opposite sides of the back 14.

In accordance with the present invention, there are applied to or installed on the covers 18 and 20 similar foldable easel means generally designated 22, which comprise elongated rectangular sheets 24 of such as relatively stiff cardboard, which are narrower than the book covers, and are of a length somewhat less than three times the heights of the covers.

The sheets 24 are divided into a middle or mounting piece 26, an upper prop piece 28, and a lower base piece 30, the upper piece 28 being connected to the upper end of the mounting piece 26 by an upper fold line 32, and the lower piece 30 being hingedly connected to the lower end of the mounting piece 26 by a lower fold line 34.

The middle or mounting piece 26 is preferably of slightly less height than a book cover, while the upper piece 28 is somewhat shorter than and to be folded downwardly against the middle piece, as shown in Figures 1 and 5, in the folded position of the easel means 22. The lower piece 30 is also somewhat shorter than the middle piece 26, and can be of the same length as the upper piece 28, and is to be folded upwardly against the down-folded upper piece, in the folded condition of the easel means 22, as also shown in Figures 1 and 5.

In the form of the invention shown in Figures 1 to 5, means for securing the middle piece 26 to the inner side of a book cover comprises lines 36 of adhesive extending along the opposite side edges of the rear side 38 of the middle piece 26, the adhesive being of any suitable kind, such as pressure-sensitive adhesive or ordinary water soluable glue or paste. For the instruction of first-time users of an easel means 22, the rear side 38 has imprinted thereon installation instructions 40; and, in the case that the middle piece 26 is to be used, in conjunction with a book cover, as a holder for a library card or like card 42, as shown in Figures 2 and 6, the upper part of the rear side 38 of the middle piece 26 has thereon instructions 42 relating to severing weakened lines 44, extending across the middle piece 26, to provide a card securing slot 46 thereon. A centering dot 48, formed through the center of the middle piece 26, is provided as a guide for centering the middle piece on a book cover in installing the same.

As shown in Figures 2 and 6, the front sides 50 and 52, respectively, of the upper and lower pieces 28 and 30 have imprinted thereon differentiating indicia, such as "Card I" and "Card II," respectively, at the heads of library date "due" and "date returned" receiving columns 54 and 56, respectively, which enable having instantly available in the book the information necessary to the book borrower and the lending library for government of the lending of the book.

As shown in Figure 5, the upper and lower fold lines 32 and 34 are in substantially the same levels as the upper and lower edges 58 and 60 of the book covers, so that the upper and lower pieces 28 and 30 can be folded rearwardly behind the covers to their easel-forming positions, wherein the lower piece 30 is in a horizontal support-engaging position, as shown in Figure 4, and the upper piece 28 is in a rearwardly declining or diagonal prop position.

For separably connecting the pieces 28 and 30 in their easel-forming positions, suitable separable securing means is provided thereon near their free ends 62 and 64, such as traverse slots 66 and 68, respectively, half in length of the widths of the pieces and opening through opposite side edges 70 and 72, of the pieces. The pieces 28 and 30 are secured separately together in their easel-forming positions by interengaging the slots 66 and 68. The lower edges of the book covers 18 and 20 and of the back 14, the lower edges of the pieces 28 and 30, and the lower or base forming piece 30 of the easel means 22 can then be rested upon any suitable support, so that the book 12 is supported thereon at an efficient and non-tiring reading angle, and the pages 16 can be turned without otherwise handling the book 12.

The form of the easel means 22a, shown in Figures 6 and 7, differs from that described above and shown in Figures 1 to 4, only in that the securing and mounting means for the easel means 22a comprises a flexible sheet material sleeve 36a, in place of the adhesive lines 35, the sleeve 36a takes the form of a sheet 70, preferably of the same width as the middle piece 26 but longer, and has upper and lower end portions 72 and 74, respectively, turned over and secured in suitable manner to the rear side 38 of the middle piece 26 at the upper and lower ends thereof, the side edges of the sheet 70 being unsecured to the middle piece 26. The sleeve 36a is slipped sidewise over the free side edge 76 of a book cover so as to install the middle piece 26 in place on the cover. This form of the invention eliminates any mutilation of book covers, as is desirable for use where relatively permanently installation, as in the form of the invention shown in Figures 1 to 5, is not desired.

Although there has been shown and described herein preferred forms of the invention, it is to be understood that the invention is not necessarily confined thereto, and that any change or changes in the structures of and in the relative arrangements of components thereof are contemplated as being within the scope of the invention as defined by the claims appended hereto.

What is claimed is:

1. A book structure comprising a cover back, and an easel means including a flat mounting piece having a front face and a back face, a flat base piece arranged so that it overlies the front face of said mounting piece with one end adjacent one end of said mounting piece, means connecting said one end of said mounting and base pieces together for movement of said base piece from the overlying position to an extended position at an angle to the back face of said mounting piece, and a prop piece arranged so that it overlies the front face of said mounting piece with one end adjacent the other end of said mounting piece, means connecting said one end of said prop piece and said other end of said mounting piece together for movement of said prop piece from the overlying position to an extended position at another angle to the back face of said mounting piece, mounting means embodying an open ended flat sleeve carried by the back face of said mounting piece, said cover back being inserted into said sleeve through one end thereof and slidably moved to a position such that the sleeve embraces the cover to thereby secure said easel means to said cover back, and cooperating means on said prop and base pieces adjacent the other ends thereof and releasably interengaging with each other when said prop and base pieces have been moved to their angular positions.

2. A book structure comprising a cover back, and an easel means including a flat mounting piece having a front face and a back face, a flat base piece arranged so that it overlies the front face of said mounting piece with one end adjacent one end of said mounting piece, means connecting said one ends of said mounting and base pieces together for movement of said base piece from the overlying position to an extended position at an angle to the back face of said mounting piece, and a prop piece arranged so that it overlies the front face of said mounting piece with one end adjacent the other end of said mounting piece, means connecting said one end of said prop piece and said other end of said mounting piece together for movement of said prop piece from the overlying position to an extended position at another angle to the back face of said mounting piece, mounting means embodying an open ended flat sleeve carried by the back face of said mounting piece, said cover back being inserted into said sleeve through one end thereof and slidably moved to a position such that the sleeve embraces the cover to thereby secure said easel means to said cover back, and cooperating means embodying a pair of slots extending in opposite directions formed on said prop and base pieces adjacent the other ends thereof and releasably interengaging with each other when said prop and base pieces have been moved to their angular positions.

References Cited in the file of this patent

UNITED STATES PATENTS

| 702,033 | Scott | June 10, 1902 |
| 815,502 | Anderson | Mar. 20, 1906 |
| 1,228,136 | Reed | May 29, 1917 |
| 2,225,830 | Harris | Dec. 24, 1940 |

FOREIGN PATENTS

| 3,882 | Great Britain | Aug. 2, 1906 |